United States Patent
Campbell

(10) Patent No.: US 6,452,599 B1
(45) Date of Patent: Sep. 17, 2002

(54) METHOD AND APPARATUS FOR GENERATING A SPECIFIC COMPUTER HARDWARE COMPONENT EXCEPTION HANDLER

(75) Inventor: Paul W. Campbell, Oakland, CA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/451,563

(22) Filed: Nov. 30, 1999

(51) Int. Cl.⁷ .................................................. G06T 1/00
(52) U.S. Cl. .......................... 345/522; 345/559; 703/23
(58) Field of Search ................................. 345/522, 418, 345/530, 531, 559, 501, 564, 557; 717/138; 703/23–27

(56) References Cited

U.S. PATENT DOCUMENTS

| | | | | |
|---|---|---|---|---|
| 5,560,013 A | * | 9/1996 | Scalzi et al. | 703/26 |
| 5,577,232 A | * | 11/1996 | Priem et al. | 717/170 |
| 5,970,237 A | * | 10/1999 | Nagaraj et al. | 703/23 |
| 6,009,261 A | * | 12/1999 | Scalzi et al. | 703/26 |
| 6,115,054 A | * | 9/2000 | Giles | 345/522 |

* cited by examiner

*Primary Examiner*—Kee M. Tung
(74) *Attorney, Agent, or Firm*—Vedder, Price, Kaufman & Kammholz

(57) ABSTRACT

A method and apparatus for generating a specific computer hardware component exception handler and emulating memory accesses to such a hardware component include processing steps that begin by determining whether an address of a CPU instruction is within the address space of the computer hardware component. When the address is within the address space of the computer hardware component, the address and data size are saved in emulation registers. The processing then continues by entering a software exception handler to process the memory access requests directed to the computer hardware component based on the data size. The processing within the software exception handler begins by reading from a plurality of computer hardware component registers to obtain a register setting. The processing then continues by generating a specific computer hardware component function based on the register settings. The processing then continues by storing the specific computer hardware component function in cache memory. The process then continues by performing the specific computer hardware component function upon data to produce a specific emulated hardware component data. The performance of the specific computer hardware component function may be done by executing an instruction that identifies an address and data size.

24 Claims, 7 Drawing Sheets

METHOD AND APPARATUS FOR GENERATING A SPECIFIC COMPUTER HARDWARE COMPONENT EXCEPTION HANDLER

TECHNICAL FIELD OF THE INVENTION

This invention relates generally to computers and more particularly to software exception handlers that emulate the functionality of a computer hardware component.

BACKGROUND OF THE INVENTION

FIG. 1 illustrates a schematic block diagram of a computing system 10 that includes a central processing unit 12, a north bridge 14, a south bridge 16, system memory 18, and a video graphics processing module 20. The central processing unit 12 is shown to include a video graphics accelerator (VGA) in/out instruction register 22. Such a register stores the VGA input/output instructions for various combinations of VGA formatting, presentation, etc. Typically, the register will include a plurality of locations for storing up to 50 bits of information per in/out instruction. Accordingly, with such a large number of bits per instruction, the number of VGA display variations is substantial.

The video graphics processing module 20 includes a VGA card 26 and a frame buffer 24. The VGA card is used only during boot up to provide a video image while a Windows™ operating system is being installed. Because each DOS based computer uses the VGA card for this limited application, every computer must include such functionality. In addition, the complexity of the VGA card is quite substantial since the type of video image being generated corresponds to the particular in/out instruction stored in register 22. Accordingly, a fair amount of hardware is required in the VGA card 26 to accommodate the substantial number of VGA formats.

FIG. 2 illustrates the same computing system 10 as in FIG. 1 with the exception that the VGA card 26 has been removed from the video graphics processing module 20. In this embodiment of the computing system 10, the system memory 18 includes software for a video graphics exception handler 28. As such, when the VGA card 26 is to be accessed, the central processing unit 12 performs the VGA exception handler software 28 to emulate the VGA card. In essence, the VGA exception handler software 28 allows the central processing unit to simulate a DOS box (i.e., a 640×480 VGA screen) to perform the same function as the VGA card. The VGA emulation is shown in greater detail with reference to FIG. 3.

FIG. 3 illustrates the processing performed by the VGA exception handler software 28. In essence, the VGA exception handler software 28 includes data processing software 36 and address processing software 38. In operation, the VGA exception handler software 28 receives a data word 30 from the central processing unit. The data word 30 includes addressing information 32 and data 34. Based on the format selected via the VGA input/output instruction register 22, the VGA exception handler processes the data 34 via the data processing software 36 and processes the address information 32 via the addressing processing software 38. In essence, the VGA exception handler 28 indicates, based on the format selected from register 22, what the data is to look like and where the manipulated data 40 is to be stored in the frame buffer.

As shown, the manipulated data 40 is stored at a particular targeted address 42 within frame buffer 24. The manipulated data may be any one of a plurality of types of formats including, for example, a 16 bit word that identifies an 8×8 pixel block for a character and its corresponding attributes, four bytes per pixel scan line information, eight bit per pixel per scan line, 16 one bit pixels, etc.

The in/out instructions provided to the VGA register 22 may be performed by a software exception handler executed by the central processing unit. As such, the particular formats, in accordance with the I/O instructions are recorded in register 22 as the central processing unit emulates such instructions.

Each time the central processing unit supplies a data word for VGA operation, the exception handler 28 performs the above-described process. As one can image, with such a substantial number of potential formats, the VGA exception handler software 28 needs to include routines to handle each of the potential VGA formats. As such, the software 28 is substantial in size and is relatively slow.

Therefore, a need exists for a method and apparatus that allows for generating a specific computer hardware component exception handler that improves the speed of performance.

DETAILED DESCRIPTION OF A PREFERRED EMBODIMENT

Generally, the present invention provides a method and apparatus for generating a specific computer hardware component exception handler and emulating memory accesses to such a hardware component. Such a method and apparatus includes processing steps that begin by determining whether an address of a CPU instruction is within the address space of the computer hardware component (e.g., accessing a VGA hardware card). When the address is within the address space of the computer hardware component, the address and data size are saved in emulation registers. The processing then continues by entering a software exception handler to process the memory access requests directed to the computer hardware component based on the data size. The processing within the software exception handler begins by reading from a plurality of computer hardware component registers to obtain a register setting. The processing then continues by generating a specific computer hardware component function based on the register settings (e.g., establishing a VGA function based on settings in the VGA register). The processing then continues by storing the specific computer hardware component function in cache memory. The process then continues by performing the specific computer hardware component function upon data to produce a specific emulated hardware component data. The performance of the specific computer hardware component function may be done by executing an instruction that identifies an address and data size. With such a method and apparatus, computer hardware components may be emulated in software in a more efficient manner than was done in prior art computing systems.

Figure 1:
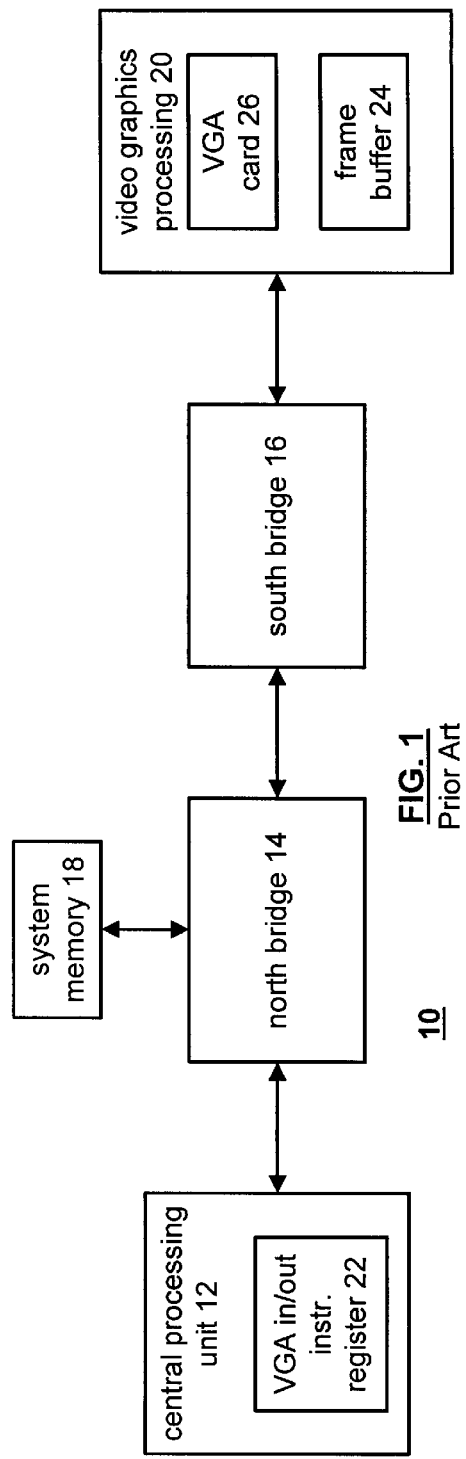
FIG. 1 illustrates a schematic block diagram of a prior art computing system.
Figure 4:
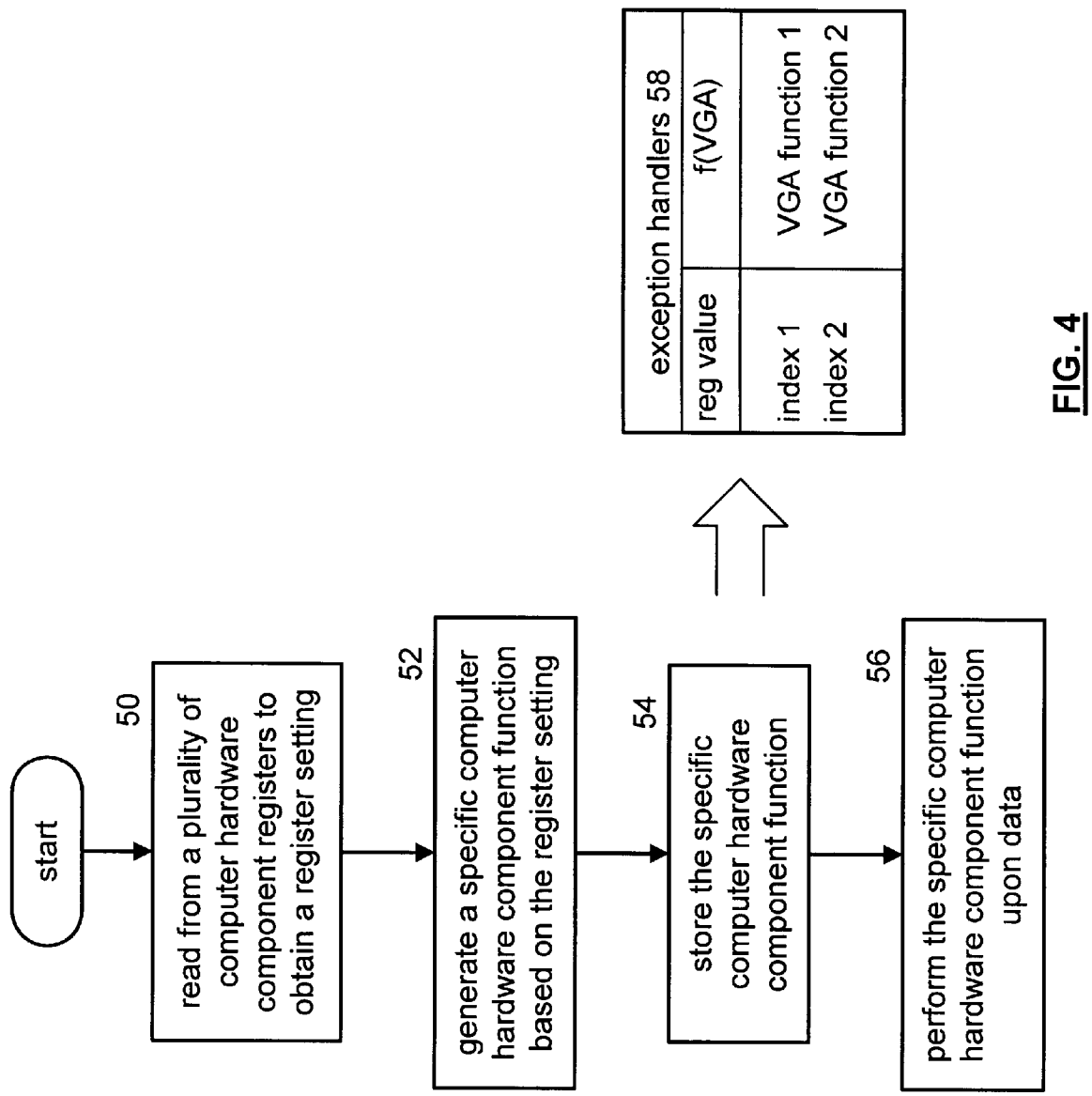
FIG. 4 illustrates a logic diagram for generating a specific computer hardware component exception handler in accordance with the present invention.

The present invention can be more fully described with reference to FIGS. 4 through 8. FIG. 4 illustrates a logic diagram of a method for generating a specific computer hardware component exception handler. Such a method may be implemented as operational instructions and executed by the computing system 10 as shown in FIG. 1 and/or 2. The process begins at step 50 where a register setting is read from a plurality of hardware component registers. The hardware component may be a video graphics accelerated (VGA) and/or a hardware cursor. Each of the plurality of computer hardware component registers stores an indicator for enabling a logic function, a data value for using in a particular logic function, or a modifying parameter of the VGA data. For example, if the hardware component is the VGA card, the hardware component registers store the various VGA formats. Each format is produced by emulating a VGA function to obtain the particular format.

The process then proceeds to step 52 where a specific computer hardware component function is generated based on the register setting. For example, if the computer hardware component is a VGA card, the specific computer hardware component function includes generating a specific VGA address function based on an address portion of the register settings and generating a specific VGA data function based on a data portion of the register setting. The process then proceeds to step 54 where the specific hardware component function is stored in cache. The process then proceeds to step 56 where the specific hardware component function is performed upon data.

If the hardware component is a VGA card, the storing of the specific function may be done as shown in the table for exception handler 58. As shown, the table includes a register value and a VGA function. The VGA function may include a data portion and an address portion. For each index, i.e., register setting, a corresponding VGA function is stored. As such, for a particular register setting, the VGA function may correspond to retrieving an 8×8 pixel block of a character and its corresponding attributes. In addition, the VGA function may indicate that the particular character is to be stored at a particular address within the frame buffer. Other VGA functions stored in the exception handler table 58 would correspond to other potential VGA formats. The table 58 is updated only when a particular VGA format is being addressed via the register settings. As such, the table 58 only includes the VGA functions for register settings that have been previously initiated by the central processing unit during boot up and/or other utilization of the VGA card.

Figure 2:
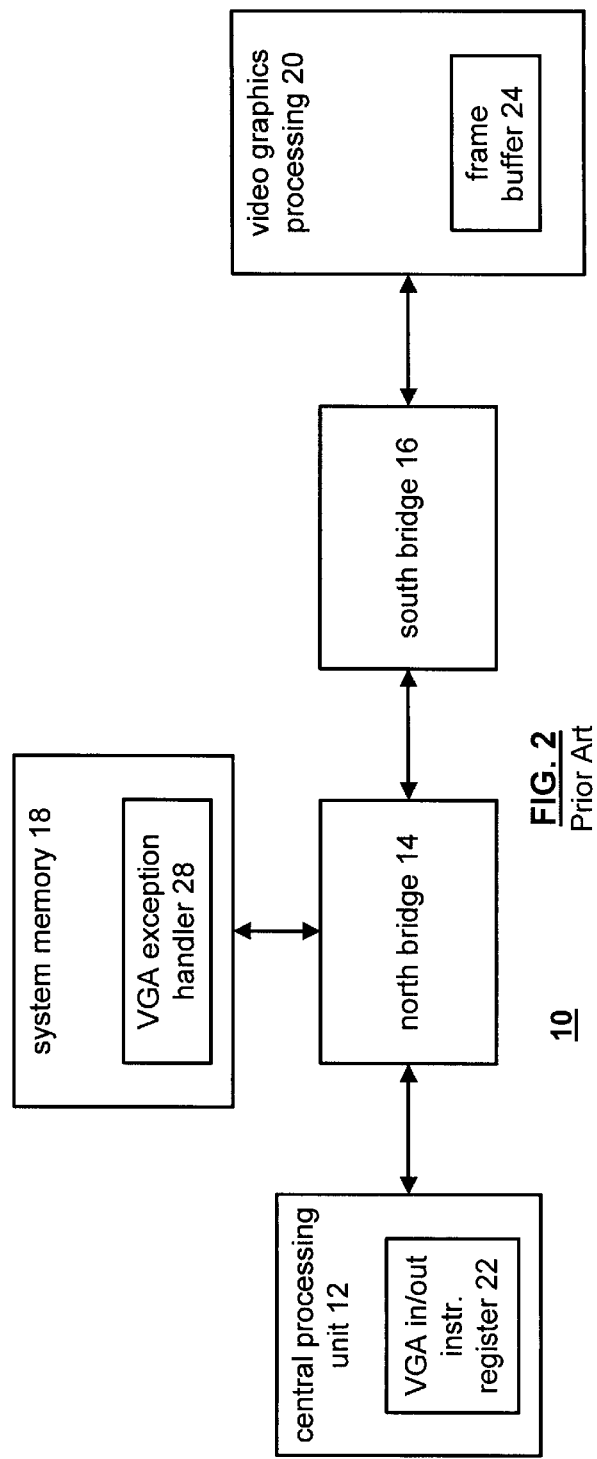
FIG. 2 illustrates an alternate embodiment of a prior art computing system.
Figure 3:
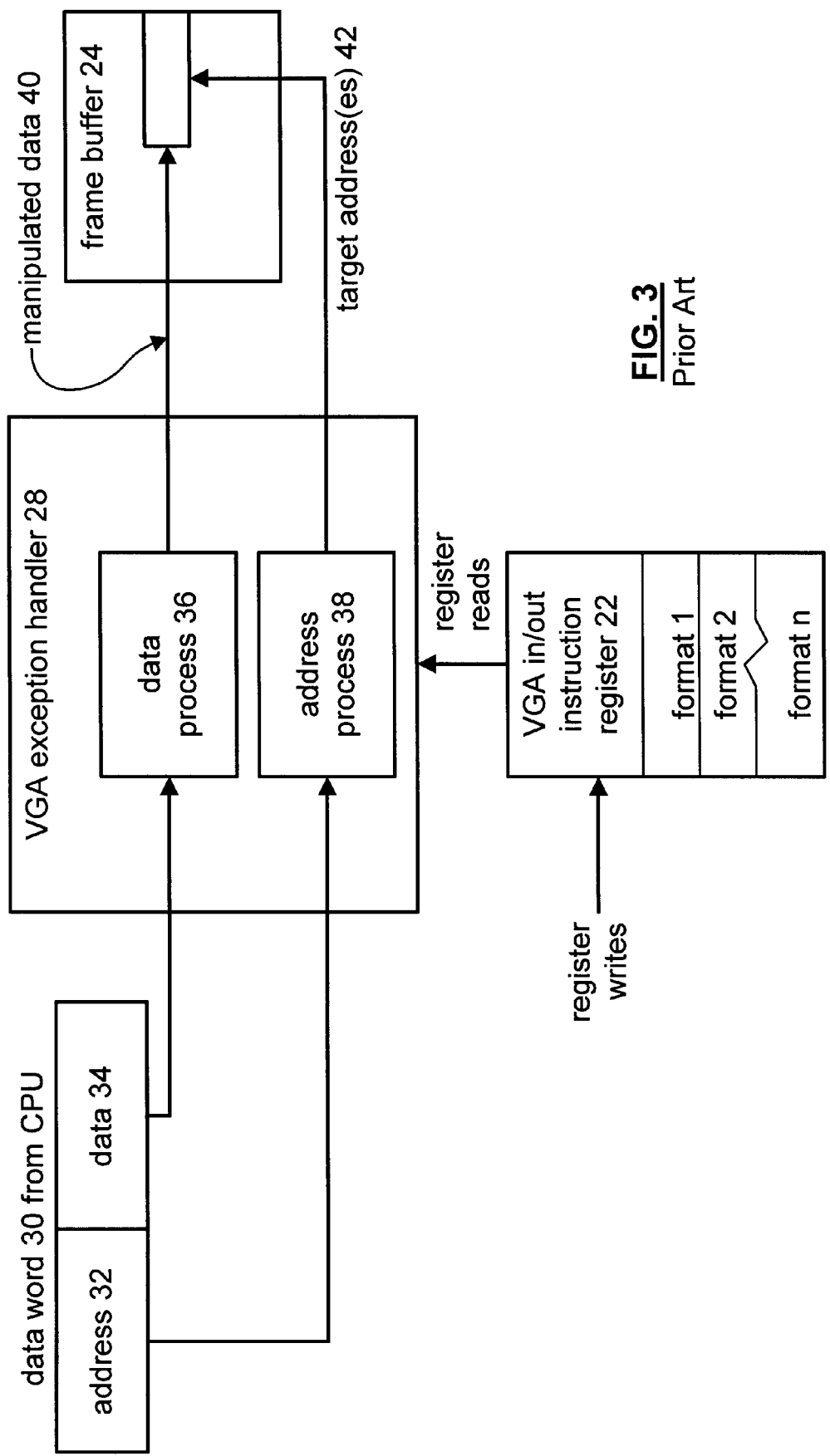
FIG. 3 illustrates a graphical representation of the performance of a prior art video graphics exception handler.
Figure 5:
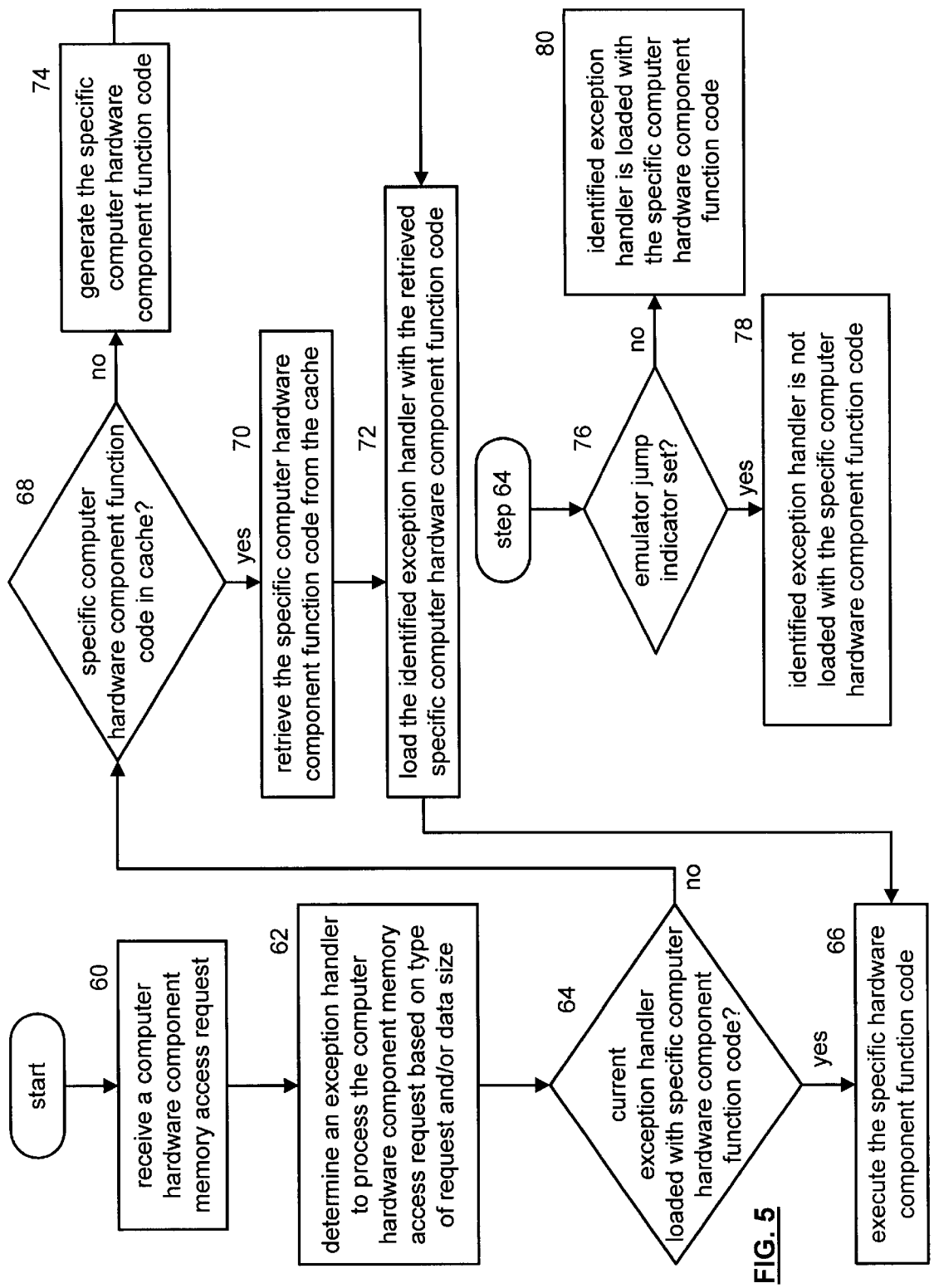
FIG. 5 illustrates a logic diagram of an alternate method for generating a specific computer hardware component exception handler in accordance with the present invention.

FIG. 5 illustrates a logic diagram of an alternate method for generating a specific computer hardware component exception handler. The processing steps of FIG. 5 may be stored as operational instructions and executed by the systems of FIG. 1 or 2. The process begins at step 60 where a computer hardware component memory access request is received. The hardware component may be a video graphics accelerator and/or a hardware cursor. The process then proceeds to step 62 where an exception handler is determined to process the computer hardware component memory access requests based on the type of request and/or data size. The type of request may be a read memory access request or a write memory access request. The data size of a data word may be an 8 bits, 16 bits, 32 bits, and/or 64 bits. All read memory access requests are handled by a read exception handler and write memory access requests are handled by one of a plurality of write exception handlers. The write exception handlers include a specific one for 8 bit write exceptions, 16 bit write exceptions, 32 bit write exceptions and/or 64 bit write exceptions.

The process then proceeds to step 64 where a determination is made as to whether the current exception handler is loaded with a specific hardware component function code. In operation, a particular exception handler will be active to process any memory requests directed towards the address space for the corresponding computer hardware component. However, each different format, for a VGA card, will have a separate exception handler. Thus, for a VGA card, the determination at step 64 is asking, giving the current register settings, is the current exception handler in accordance with such register settings. If so, the process proceeds to step 66 where the specific hardware component function code is executed to emulate the hardware component.

If, however, the exception handler is not loaded with the specific computer hardware function code, the process proceeds to step 68. At step 68 a determination is made as to whether the specific computer hardware component function code is cached. If not, the process proceeds to step 74 where the specific computer hardware component function code is generated. This was discussed with reference to FIG. 4.

If, however, the specific computer hardware component function code is cached, the process proceeds to step 70. At step 70, the specific computer hardware component function code is retrieved from the cache. The process then proceeds to step 72 where the identified exception handler is loaded with the retrieved specific computer hardware component function code. Note that if the function code was generated at step 74, the exception handler is loaded with that code. Having done this, the process proceeds to step 66 where the specific hardware component is executed.

Step 64 is described in greater detail with reference to steps 76 through 80. At step 76 a determination is made as to whether an emulator jump indication (e.g., a bit, a branch instruction, or a changed exception vector address) is set. The emulator jump indicator will be set when a format change is registered for the hardware component. For a VGA card, this occurs when an in/out instruction is changed, which changes the register setting. The changing of the register setting causes the jump indicator to be set. If the jump indicator is not set as determined at step 76, the process proceeds to step 80 where the identified exception handler is loaded with the specific computer hardware component function code. If, however, the jump indicator is set, the process proceeds to step 78 where the identified exception handler is not loaded with the specific hardware component function and the process continues at step 68.

Figure 6:
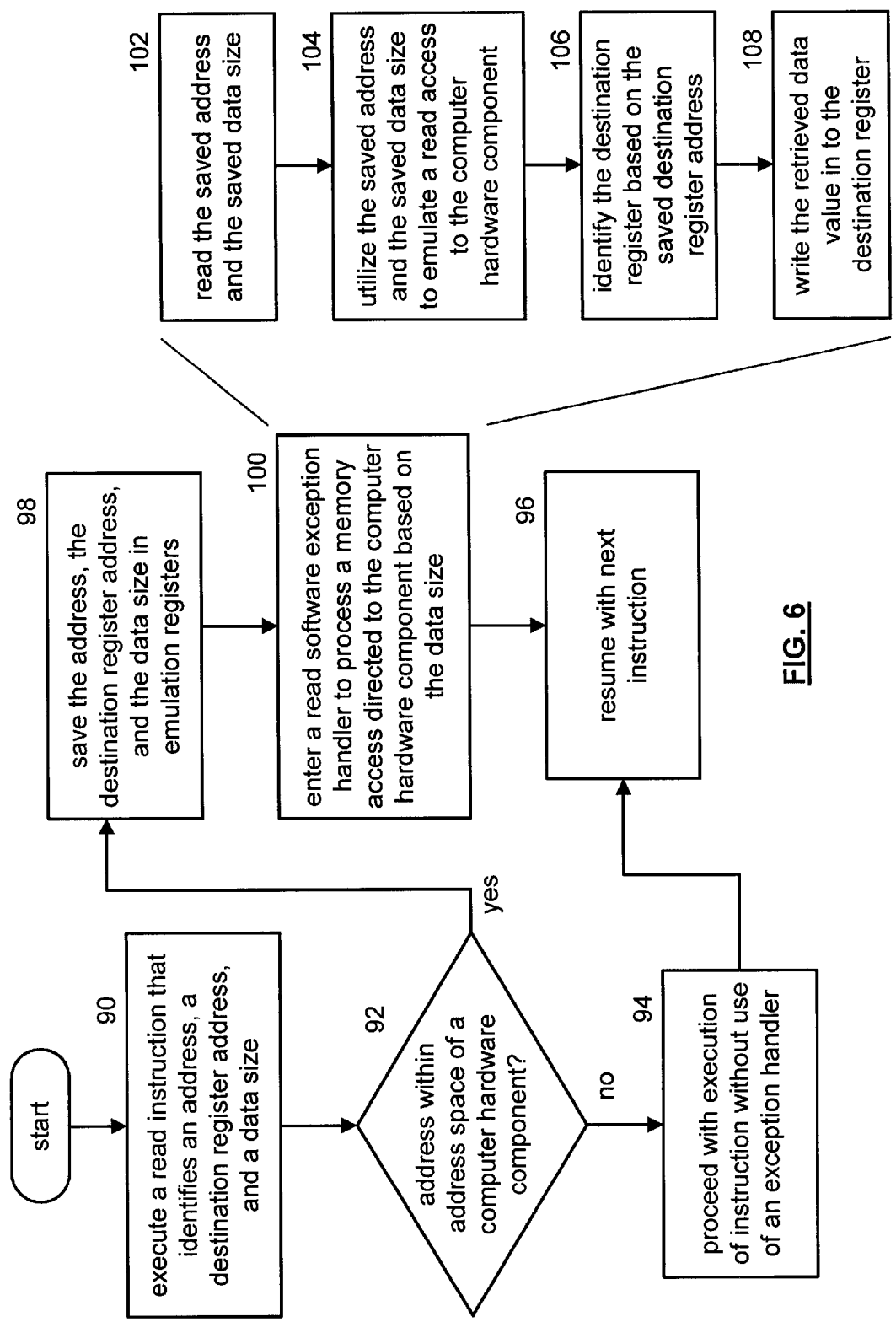
FIG. 6 illustrates a logic diagram of a method for emulating a read memory access directed to a computer hardware component in accordance with the present invention.

FIG. 6 illustrates a logic diagram of a method for emulating read memory access requests directed to a computer hardware component. The steps of FIG. 6 may be implemented as operational instructions and executed by the systems of FIG. 1 or 2. The process begins at step 90 where a read instruction is executed. The read instruction identifies an address, a designation register address and a data size. The address corresponds to the particular address in system memory that the data to be read resides. The process then proceeds to step 92 where a determination is made as to whether the address lies within the address space of the computer hardware component. If not, the process proceeds to step 94 where the execution of the instruction proceeds without use of an exception handler. The process then proceeds to step 96 where the execution by the CPU resumes with a next instruction.

If, however, the address is within the address space of a computer hardware component, the process proceeds to step 98. At step 98 the address, the destination register address and the data size are stored in emulation registers. Note that the destination register corresponds to a register within the CPU, which stores retrieved data for subsequent processing. The process then proceeds to step 100 where a read software exception handler is entered to process the read memory access directed to the computer hardware component based on the data size. The process then resumes at step 96.

The processing at step 100 is shown in greater detail with respect to steps 102 through 108. At step 102 the saved address and the saved data size are read from the emulation registers. The process then proceeds to step 104 where the saved address and the saved data size are utilized to emulate a read access to the computer hardware component. The process then proceeds to step 106 where the destination register is identified based on the saved destination register address. The process then proceeds to step 108 where the retrieved data is written into the destination register. For example, if the hardware component is a VGA card, the read software exception handler emulates the function of the VGA component.

Figure 7:
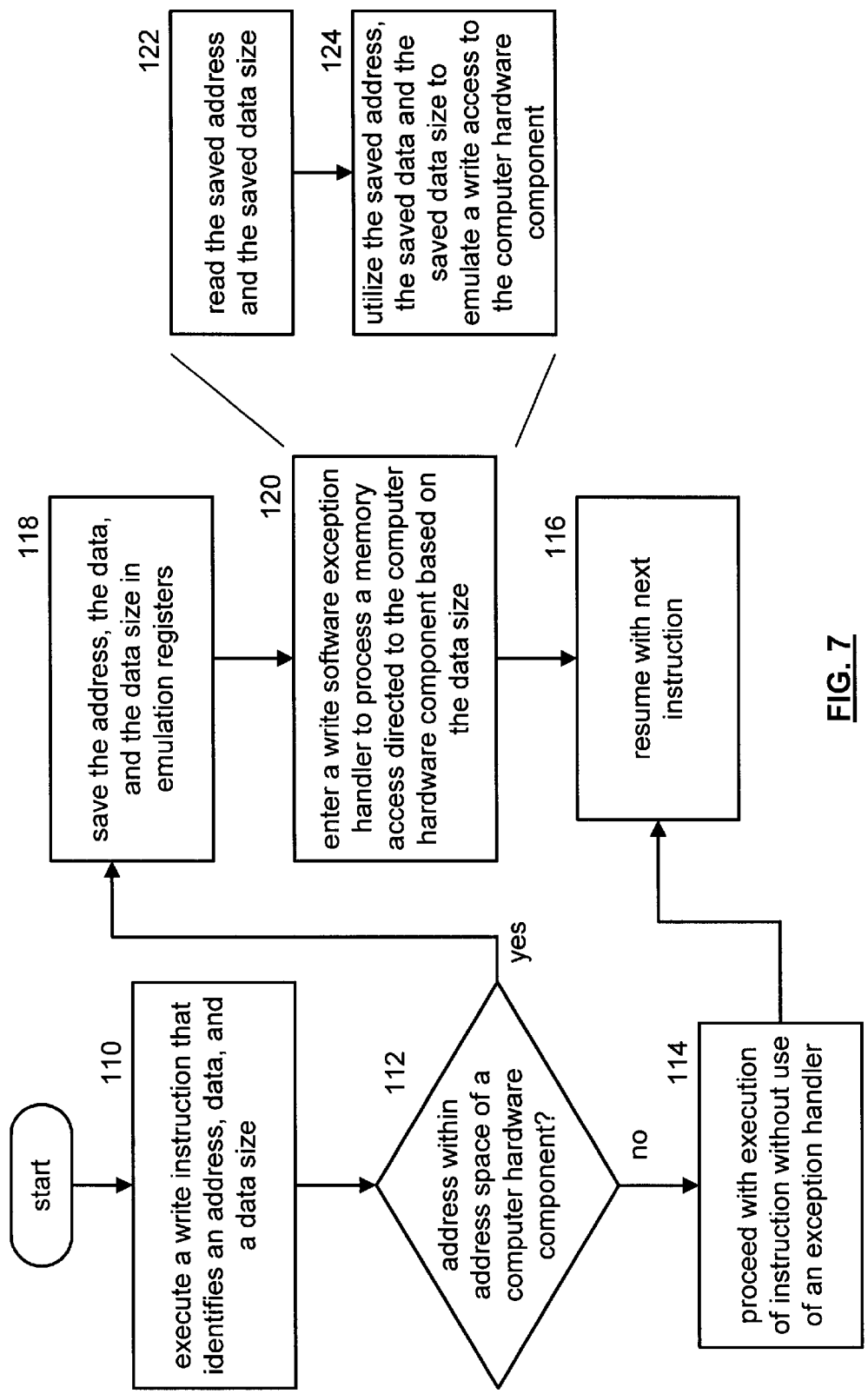
FIG. 7 illustrates a logic diagram of a method for emulating a write memory access directed to a computer hardware component in accordance with the present invention.

FIG. 7 illustrates a logic diagram of a method for emulating a write memory access directed towards a computer hardware component. The steps of FIG. 7 may be implemented as operational instructions and executed by the system of FIGS. 1 and/or 2. The process begins at step 110 where a write instruction is executed by the central processing unit. The write instruction identifies an address, data, and a data size. The process then proceeds to step 112 where a determination is made as to whether the address lies within the address space of the computer hardware component. If not, the process proceeds to step 114 where the execution of the instruction proceeds without the use of an exception handler. The process then proceeds to step 116 where the CPU resumes execution of the next instruction.

If, however, the address is within the address space of the computer hardware component, the process proceeds to step 118. At step 118 the address, the data, and the data size are saved in emulation registers. The process then proceeds to step 120 where a write software exception handler is entered to process the write memory access based on the data size. Having emulated the write memory access, the process resumes at step 116.

The entering of the write software exception handler at step 120 is further discussed with reference to steps 122 and 124. At step 122, the saved address and the saved data size are read from the emulation registers. The process then proceeds to step 124 where the saved address, the saved data and the saved data size are used to emulate a write access to the computer hardware component. As previously mentioned, an exception handler may be generated for various size of write memory access requests. For example, a separate one may be generated for an 8 bit write request, a 16 bit request, a 32 bit request and/or a 64 bit request.

Figure 8:
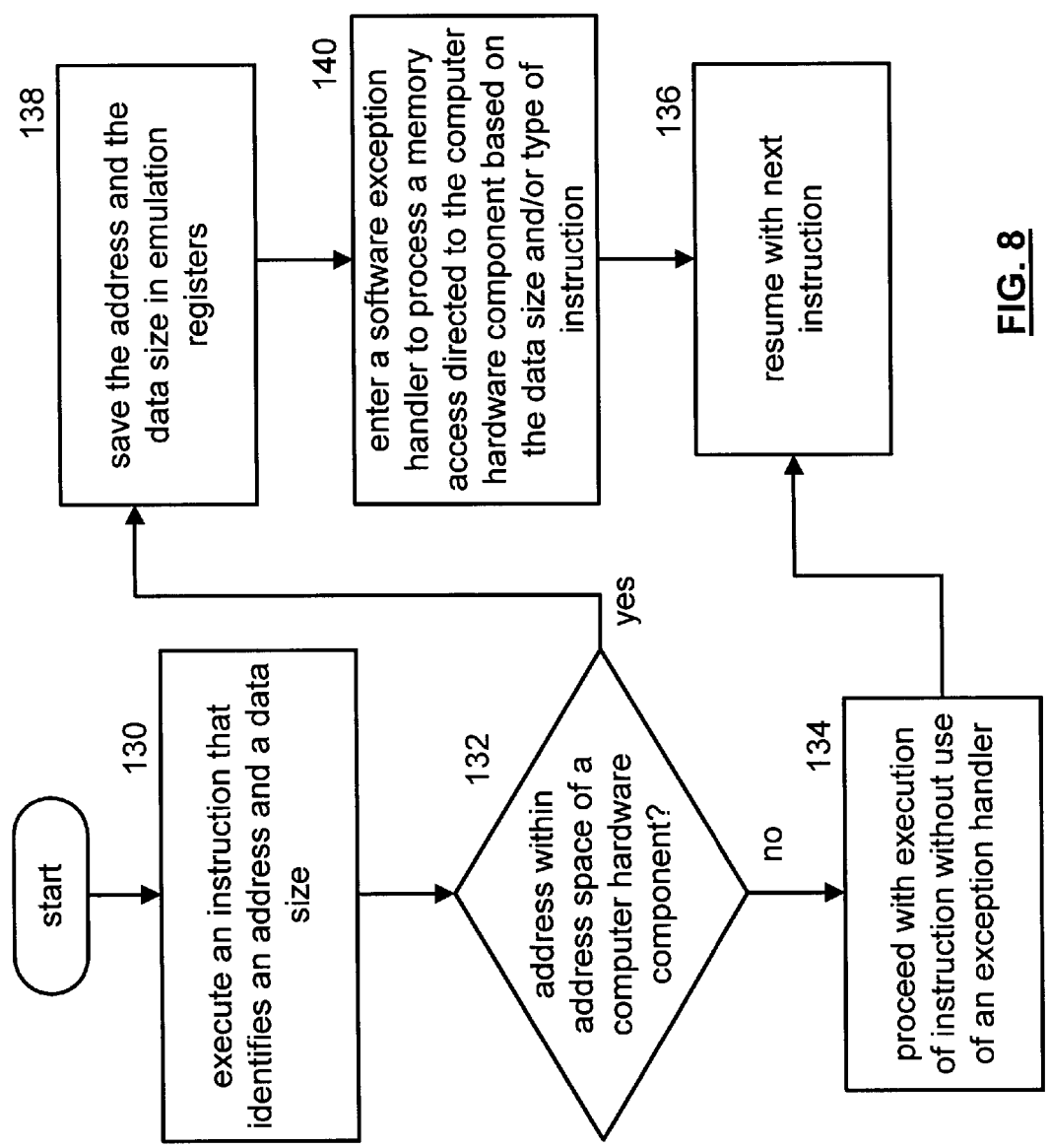
FIG. 8 illustrates a logic diagram of a method for emulating memory accesses directed to a computer hardware component in accordance with the present invention.

FIG. 8 illustrates a logic diagram of a method for emulating memory access requests directed to a computer hardware component. The processing step of FIG. 8 may be implemented as operational instruction and executed by a system shown in FIG. 1 or 2. The process begins at step 130 where the central processing unit executes an instruction and identifies an address and a data size. The process then proceeds to step 132 where a determination is made as to whether the address lies within the address space of a computer hardware component. If not, the process proceeds to step 134 where the CPU proceeds with the execution of the instruction without use of an exception handler. The process then proceeds to step 134 where the CPU resumes with the next instruction.

If, however, the address lies within the address space of the computer hardware component, the process proceeds to step 138. At step 138, the CPU saves the address and the data size and emulation registers. The process then proceeds to step 140 where the CPU enters a software exception handler to process the memory access request directed towards the computer hardware component based on the data size and/or type of instruction. The type of instruction is a read instruction, the processing steps of FIG. 6 are utilized. If the type of instruction is a write instruction, the processing steps of FIG. 7 are used.

The preceding discussion has presented a method and apparatus for generating a specific computer hardware component exception handler and then utilizing the exception handler to emulate memory accesses directed towards the computer hardware component. By caching the corresponding function code for a specific register setting the function code does not need to be regenerated each time the hardware component is being accessed. As such, the present invention provides a more efficient means of generating and utilizing software exception handlers to emulate computer hardware components. As one of average skill in the art will appreciate, other embodiments may be derived from the teachings of the present invention without deviating from the scope of the claims.

What is claimed is:

1. A method for generating a specific computer hardware component exception handler, the method comprises the steps of:
    a) reading from a plurality of computer hardware component registers to obtain a register setting;
    b) generating a specific computer hardware component function based on the register setting;
    c) storing the specific computer hardware component function; and
    d) performing the specific computer hardware component function upon data to produce specific emulated hardware computer component data.

2. The method of claim 1, wherein the computer hardware component comprises at least one of: a video graphics accelerator (VGA) and hardware cursor.

3. The method of claim 2, wherein step (b) further comprises:
    generating a specific VGA address function based on an address portion of the register setting; and
    generating a specific VGA data function based on a data portion of the register settings.

4. The method of claim 1, wherein step (c) further comprises indexing a specific VGA function as the specific computer hardware component in memory based on the register setting.

5. The method of claim 1, wherein each of the plurality of computer hardware component registers store an indicator for enablement of a logic function, a data value for using in a particular logic function, or a modification parameter of the data.

6. A method for emulating memory access requests to a computer hardware component, the method comprises the steps of:
   a) receiving a computer hardware component memory access request;
   b) determining an exception handler to process the computer hardware component memory access request based on at least one of: type of computer hardware component memory access request and size of data associated with the computer hardware component memory access request to produce an identified exception handler;
   c) determining whether the identified exception handler is currently loaded with specific computer hardware component function code;
   d) when the identified exception handler is not currently loaded with specific computer hardware component function code, determining whether the specific computer hardware component function code is cached;
   e) when the specific computer hardware component function code is cached, retrieving the specific computer hardware component function code from cache; and
   f) loading the identified exception handler with the retrieved specific computer hardware component function code.

7. The method of claim 6 further comprises executing the specific computer hardware component function code upon the data.

8. The method of claim 6, wherein the computer hardware component comprises at least one of: a video graphics accelerator (VGA) and a hardware cursor.

9. The method of claim 6, wherein step (c) further comprises:
   determining whether an emulator jump indicator is set; and
   when the emulator jump indicator is set, determining that the identified exception handler is not currently loaded with the specific computer hardware component function code.

10. The method of claim 9 further comprises setting the emulator jump indicator when a format change is registered for the hardware computer component.

11. The method of claim 6 further comprises generating the specific computer hardware component function code when the specific computer hardware component function code is not cached.

12. The method of claim 6, wherein step (b) further comprises:
   identifying a VGA read exception handler to process a VGA read memory access request;
   identifying an eight bit VGA write exception handler to process an eight bit VGA write memory access request;
   identifying a sixteen bit VGA write exception handler to process a sixteen bit VGA write memory access request;
   identifying a thirty-two bit VGA write exception handler to process a thirty-two bit VGA write memory access request; and
   identifying a sixty-four bit VGA write exception handler to process a sixty-four bit VGA write memory access request.

13. An apparatus for generating a specific computer hardware component exception handler, the apparatus comprises:
   a processing module; and
   memory operably coupled to the processing module, wherein the memory includes operational instructions that cause the processing module to: (a) read from a plurality of computer hardware component registers to obtain a register setting; (b) generate a specific computer hardware component function based on the register setting; (c) store the specific computer hardware component function; and (d) perform the specific computer hardware component upon data to produce specific emulated hardware computer component data.

14. The apparatus of claim 13, wherein the computer hardware component comprises at least one of: a video graphics accelerator (VGA) and hardware cursor.

15. The apparatus of claim 14, wherein the memory further comprises operational instructions that cause the processing module to:
   generate a specific VGA address function based on an address portion of the register setting; and
   generate a specific VGA data function based on a data portion of the register settings.

16. The apparatus of claim 14, wherein the memory further comprises operational instructions that cause the processing module to store the specific VGA function by indexing the specific VGA function in memory based on the register setting.

17. The apparatus of claim 13, wherein each of the plurality of computer hardware component registers store an indicator for enablement of a logic function, a data value for using in a particular logic function, or a modification parameter of the data.

18. An apparatus for emulating memory access requests to a computer hardware component, the apparatus comprises:
   a processing module; and
   memory operably coupled to the processing module, wherein the memory includes operational instructions that cause the processing module to: (a) receive a computer hardware component memory access request; (b) determine an exception handler to process the computer hardware component memory access request based on at least one of: type of computer hardware component memory access request and size of data associated with the computer hardware component memory access request to produce an identified exception handler; (c) determine whether the identified exception handler is currently loaded with specific computer hardware component function code; (d) when the identified exception handler is not currently loaded with specific computer hardware component function code, determine whether the specific computer hardware component function code is cached; (e) when the specific computer hardware component function code is cached, retrieve the specific computer hardware component function code from cache; and (f) load the identified exception handler with the retrieved specific computer hardware component function code.

19. The apparatus of claim 18, wherein the memory further comprises operational instructions that cause the processing module to execute the specific computer hardware component function code upon the data.

20. The apparatus of claim 18, wherein the computer hardware component comprises at least one of: a video graphics accelerator (VGA) and a hardware cursor.

21. The apparatus of claim 18, wherein the memory further comprises operational instructions that cause the processing module to determine whether the identified exception handler is currently loaded with specific computer hardware component function code by:
  determining whether an emulator jump indicator is set; and
  when the emulator jump indicator is set, determining that the identified exception handler is not currently loaded with the specific computer hardware component function code.

22. The apparatus of claim 18, wherein the memory further comprises operational instructions that cause the processing module to set the emulator jump indicator when a format change is registered for the hardware computer component.

23. The apparatus of claim 18, wherein the memory further comprises operational instructions that cause the processing module to generate the specific computer hardware component function code when the specific computer hardware component function code is not cached.

24. The apparatus of claim 18, wherein the memory further comprises operational instructions that cause the processing module to determine the exception handler by:
  identifying a VGA read exception handler to process a VGA read memory access request;
  identifying an eight bit VGA write exception handler to process an eight bit VGA write memory access request;
  identifying a sixteen bit VGA write exception handler to process a sixteen bit VGA write memory access request;
  identifying a thirty-two bit VGA write exception handler to process a thirty-two bit VGA write memory access request; and
  identifying a sixty-four bit VGA write exception handler to process a sixty-four bit VGA write memory access request.

* * * * *